United States Patent [19]
Gaskell
[11] Patent Number: 4,852,803
[45] Date of Patent: Aug. 1, 1989

[54] FUEL INJECTION NOZZLES

[75] Inventor: David J. Gaskell, Sudbury, England
[73] Assignee: Lucas Industries public limited company, Birmingham, England

[21] Appl. No.: 124,825
[22] Filed: Nov. 24, 1987
[30] Foreign Application Priority Data
Nov. 29, 1986 [GB] United Kingdom ............... 86/28600
[51] Int. Cl.[4] ........................... B29C 45/20; B05B 1/28
[52] U.S. Cl. ....................................... 239/86; 239/104; 239/533.9; 239/575
[58] Field of Search .......... 239/86, 104, 533.3-533.12, 239/575, 590

[56] References Cited

U.S. PATENT DOCUMENTS

| | | | |
|---|---|---|---|
| 1,990,875 | 2/1935 | Mock | 239/86 |
| 2,896,856 | 7/1959 | Kravits | 239/86 X |
| 4,434,976 | 3/1984 | Murakami | 239/590 X |
| 4,635,853 | 1/1987 | Mowbray | 239/533.3 |

FOREIGN PATENT DOCUMENTS

| | | | |
|---|---|---|---|
| 119780 | 4/1945 | Australia | 239/533.11 |
| 298252 | 10/1928 | United Kingdom | 239/86 |
| 2142972 | 1/1985 | United Kingdom | 239/533.3 |

*Primary Examiner*—Andres Kashnikow
*Assistant Examiner*—Patrick N. Burkhart
*Attorney, Agent, or Firm*—Richard Bushnell

[57] ABSTRACT

A fuel injection nozzle for an internal combustion engine includes a valve member which is slidable in a nozzle body. The body is provided with a bore in which is formed a seating and to support the valve member there is provided a sleeve which is an interference fit within a wider portion of the bore. Fuel under pressure is conveyed by grooves defined on the outer surface of the sleeve from a nozzle inlet and the fuel flows from the grooves through slits formed in the sleeve, to a space defined between the valve member and the bore. The pressure of fuel acts on the valve member to lift the valve member from the seating and the slits are sufficiently narrow to retain particles of dirt entrained in the fuel.

3 Claims, 2 Drawing Sheets

FIG. I.
PRIOR ART

FUEL INJECTION NOZZLES

This invention relates to a fuel injection nozzle for supplying fuel to an internal combustion engine, the nozzle comprising an elongated body, a bore formed in the body, a seating defined at one end of the bore, a valve member for co-operation with the seating to control fuel flow from the bore to an outlet in the body, a sleeve secured in the end portion of the bore remote from the seating, the internal surface of said sleeve supporting the valve member for movement towards and away from the seating and passage means defined between the external peripheral surface of the sleeve and the wall of the bore, said passage means acting to convey fuel from a fuel inlet to a point in the bore intermediate the sleeve and the seating.

An example of such a nozzle is known from British specification No. 2142972A, the passage means being formed by a pair of helical grooves formed in the external surface of the sleeve. The fuel flowing through the grooves is supplied to the bore and the pressure of fuel acts upon an area of the valve member to lift the valve member away from the seating to permit fuel flow through the outlet. In the example the outlet is of comparatively large size and the valve member carries a shaped extension which projects through the outlet to control the fuel flow area of the outlet. In other forms of nozzle the outlet can be an orifice or a number of orifices of small diameter, the valve member in this case not having an extension.

It is not uncommon to provide individual filters in such nozzles which act to trap particles of dirt in the fuel to prevent possibility of the outlet becoming blocked or partly blocked. It is known from U.S. Pat. No. 1,633,320 to construct the sleeve and the groove so as to form a so-called edge filter but in this arrangement the surfaces of the bore and sleeve have to be carefully machined to provide the required clearance and one groove must be connected to the inlet and the other to the bore. Moreover, with this arrangement the sleeve has to be secured within the bore in some manner other than an interference fit.

The object of the present invention is to provide a nozzle of the kind specified in a simple and convenient form.

According to the invention in a fuel injection nozzle of the kind specified said passage means is defined by a plurality of grooves formed in the external wall of the sleeve, the end portion of the sleeve directed towards the seating and the valve member defining an annular space and slits extending through the sleeve from the base walls of the grooves to said space, said slits being of a width small enough to trap particles of dirt contained in the fuel flowing therethrough.

Figure 1:
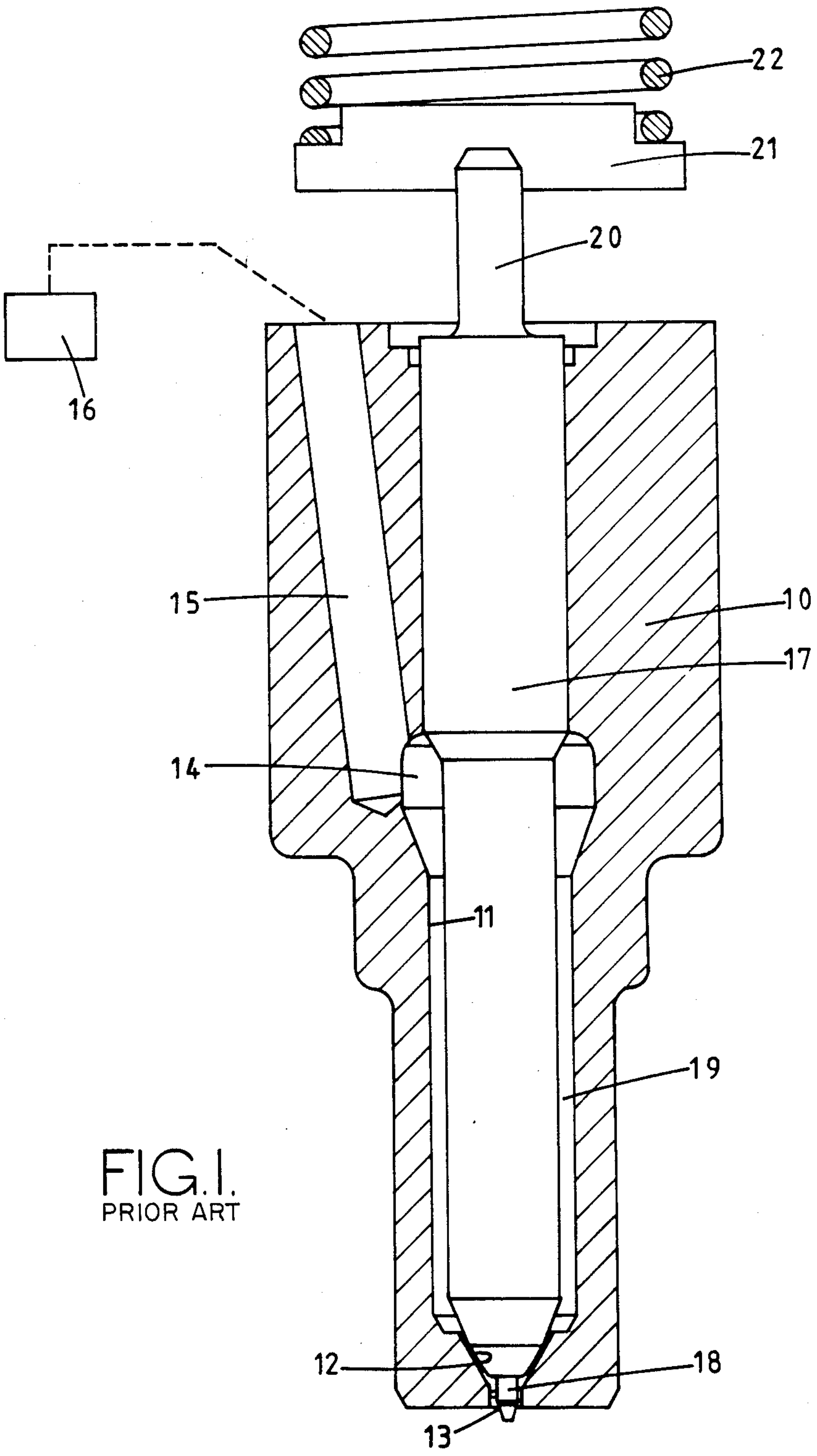
Figure 2:
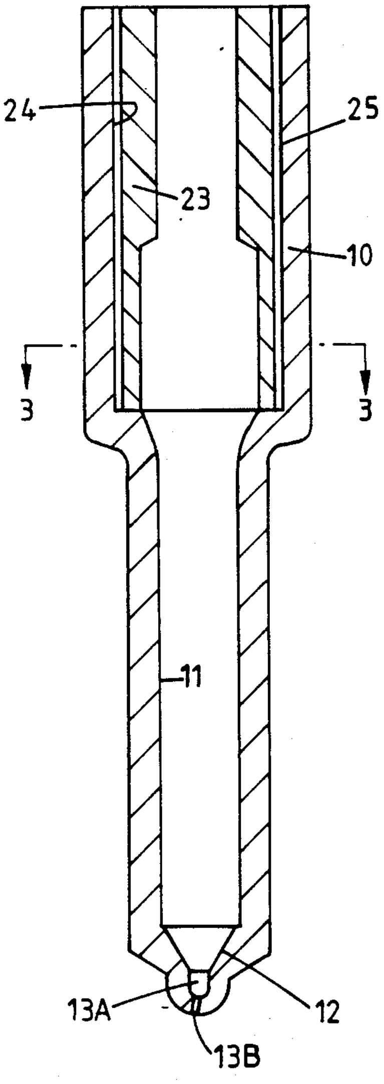
Figure 3:
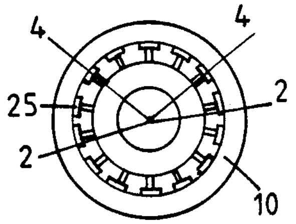
Figure 4:
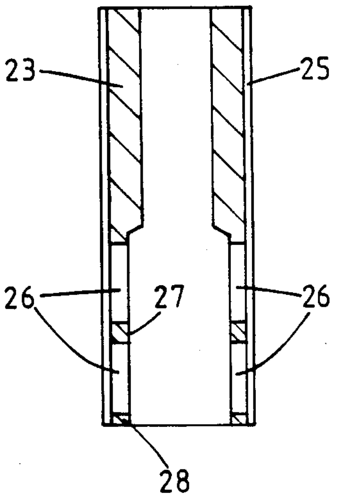

An example of a fuel injection nozzle in accordance with the invention will now be described with reference to the accompanying drawings in which:

FIG. 1 shows a conventional form of nozzle in sectional side elevation,

FIG. 2 shows the body of the fuel injection nozzle modified in accordance with the invention with the section taken along the line 2—2 of FIG. 3, FIG. 3 is a sectional plan view along the line 3—3 of FIG. 2 of part of the nozzle seen in FIG. 2, and FIG. 4 is a sectional side elevation of the part of the nozzle seen in FIG. 3 and taken along the line 4—4 of FIG. 3.

Referring to FIG. 1 of the drawings, the nozzle comprises a body 10 of stepped form the narrower end of the body in use being exposed within a combustion space of an associated engine. The nozzle body in practice is secured to a support member or holder by means of a cap nut and formed within a body in a blind bore 11 which extends from the wider end of the body to adjacent the narrower end thereof. At the blind end of the bore there is defined a seating 12 about an outlet opening 13 or in the case of the nozzle shown in FIG. 2, about a space 13A from which extends an outlet orifice 13B. Intermediate the ends of the bore the latter is provided with an enlargement 14 which communicates with a fuel inlet formed in the aforesaid holder, by way of an inlet passage 15. The inlet passage 15 runs alongside the bore 11 to the wider end of the body and in use is connected to the outlet of a fuel injection pump 16.

Located within the bore is a valve member 17 which at its end adjacent the seating is shaped to co-operate with the seating. This end of the valve member, in the case of the example shown in FIG. 1, also mounts an extension 18 which projects with clearance through the outlet opening 13. The portion of the valve member which is disposed between the enlargement and the blind end of the bore is of reduced diameter to define an annular clearance 19 which communicates with the enlargement 14 to permit passage of fuel from the enlargement through the outlet opening 13 when the valve member is lifted from its seating.

At its end remote from the seating the valve member is provided with a peg 20 which carries a spring abutment 21, the latter being engaged by a coiled compression spring 22. The spring is mounted within a vented chamber defined in the aforesaid holder and in operation, fuel under pressure supplied to the enlargement 14 acts on the differential area of the valve member to create a force which acts to move the valve member against the action of the spring. When the force exerted by the spring is overcome the valve member is lifted from its seating to allow fuel flow through the annular clearance defined between the extension 18 and the wall of the outlet opening 13. The extension is profiled to control the fuel flow through the opening and may also be profiled to alter the shape of the fuel spray and/or the rate at which fuel can flow. In the case of the arrangement shown in FIG. 2 the valve member is not provided with an extension and when the valve member is lifted from its seating, fuel can flow into the space 13A and from the space 13A through the outlet orifice 13B in the usual manner.

As described in U.S. Pat. No. 2,142,972, the provision of the passage 15 in the nozzle body requires the nozzle body to have a slightly increased diameter and in order to obviate the need for the passage, a sleeve 23 is provided which is an interference fit within an enlarged portion 24 of the bore 11. The outer peripheral surface of the sleeve is provided with a plurality of axially extending grooves 25 and the grooves 25 allow passage of fuel between the sleeve and the enlarged portion of the bore. As will be seen from FIGS. 2 and 3 the end portion of the sleeve 23, which is presented to the seating 12, has a slightly larger internal diameter which with the reduced diameter of the valve member at this point, forms an annular space which is equivalent to the enlargement 14. The aforesaid annular space is brought into communication with the grooves 24, by generally radial slits 26 which extend inwardly through the sleeve from the base walls of the grooves 25. The slits 26 may for example, have a width of 30 micrometers with a tolerance of ±5 micrometers and they can be formed by a technique known as laser milling.

As will be seen from FIG. 4 the slits 26 do not extend the complete length of the portion of the sleeve having the enlarged internal diameter. Instead a rib or ribs 27 is left intermediate the ends of said portion of the sleeve and a rim 28 is left at the end of the sleeve. The rim and rib act to strengthen the sleeve to prevent internal collapse due to fuel pressure. The slits are of a width to constitute edge filters so that any particles of dirt which flow down the grooves 25 will be trapped by one of the slits associated therewith.

The grooves 25 receive fuel from a nozzle inlet which connects with a passage in the nozzle holder. Distribution of fuel between the grooves can be effected if the fuel is supplied to a few only of the grooves, by an annular recess formed in the exterior surface of the sleeve.

I claim:

1. A fuel injection nozzle for supplying fuel to an internal combustion engine comprising an elongated body, a bore formed in the body, a seating defined at one end of the bore, a valve member for co-operation with the seating to control fuel flow from the bore to an outlet in the body, a sleeve secured in the end portion of the bore remote from the seating, the internal surface of said sleeve supporting the valve member for movement towards and away from the seating and passage means defined between the external peripheral surface of the sleeve and the wall of the bore, said passage means acting to convey fuel from a fuel inlet to a point in the bore intervediate the sleeve and the seating, said passager means being defined by a plurality of grooves of predetermined width formed in the external wall of the sleeve, the end portion of the sleeve directed towards the seating and the valve member defining an annular space and radial slits having a width less than said predetermined width extending through the sleeve from the base walls of the grooves to said space, and radial slits being of a width small enough to trap particles of dirt contained in the fuel flowing therethrough.

2. A nozzle according to claim 1 in which the end portion of the sleeve has a rib intermediate the ends thereof and a rim at the end thereof presented to the seating, said rib and rim acting to strengthen said end portion.

3. A nozzle according to claim 1 in which said slits have a width of 30 micrometers.

* * * * *